July 17, 1923.

K. R. PETERS

MOTOR VEHICLE

Filed Feb. 9, 1922

1,461,735

3 Sheets-Sheet 3

Inventor:
Karl R. Peters
By DeWitt Goodwin
Attorney

Patented July 17, 1923.

1,461,735

UNITED STATES PATENT OFFICE.

KARL R. PETERS, OF PHILADELPHIA, PENNSYLVANIA.

MOTOR VEHICLE.

Application filed February 9, 1922. Serial No. 535,367.

*To all whom it may concern:*

Be it known that I, KARL R. PETERS, a citizen of the United States, residing at Philadelphia, in the county of Philadelphia and State of Pennsylvania, have invented certain new and useful Improvements in Motor Vehicles, of which the following is a specification.

My invention relates to improvements in motor vehicles, and particularly relates to motor vehicles in which power is applied through the steering wheel. My invention particularly relates to a three wheeled vehicle in which the front wheel is used for driving and steering the vehicle.

The object of my invention is to provide a motor secured in a fixed position upon the vehicle frame and communicate the power from the motor to the steering and driving wheel, through gearing mounted upon the steering frame and freely rotatable upon an axis extending in alignment with the axis of the steering frame, and which will permit the free turning of the steering frame while power is being transmitted through the gearing; and a further object of my invention is to provide a novel form of spring suspension for supporting the steering frame and the steering head of the vehicle.

Figure 1:
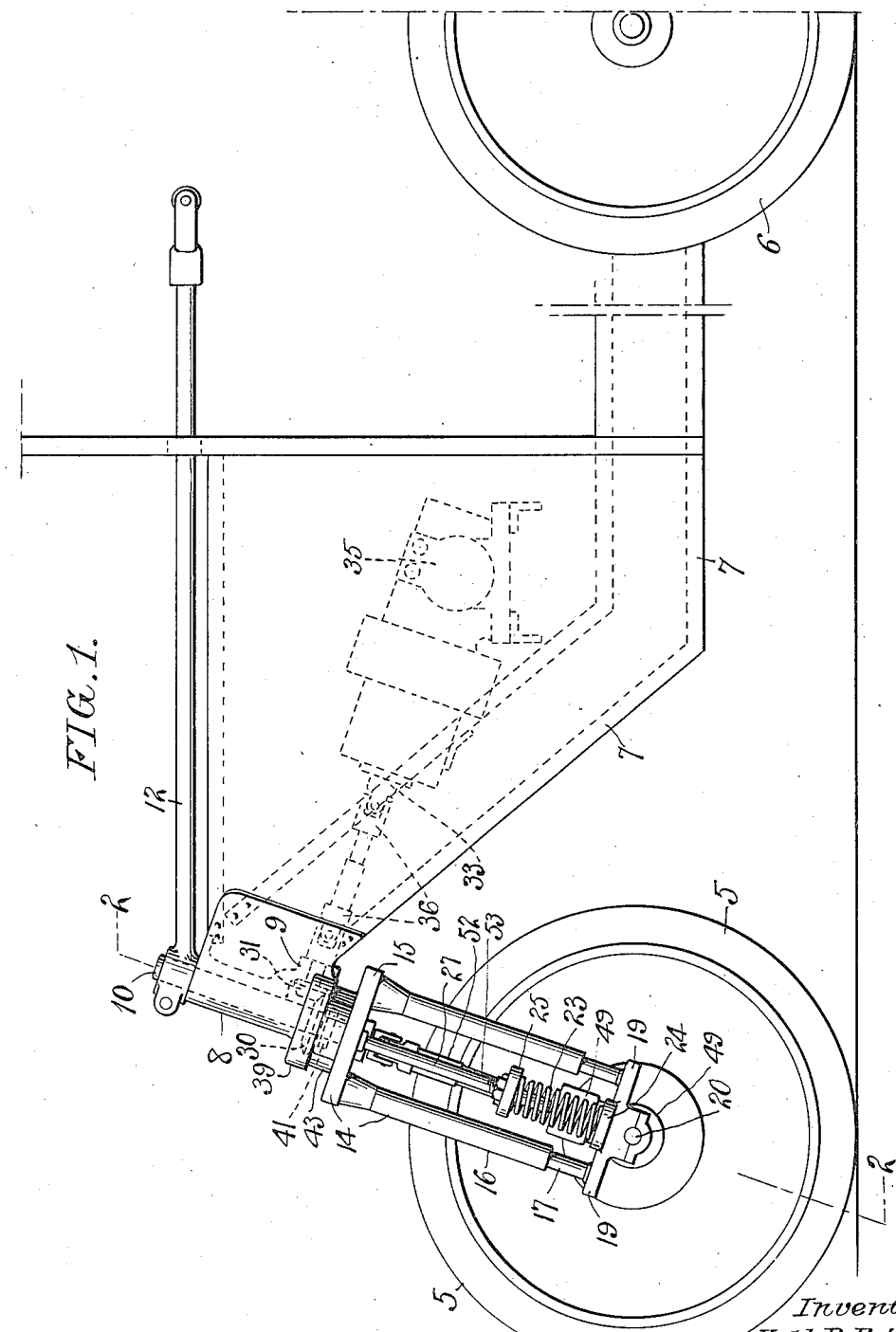
Figure 2:
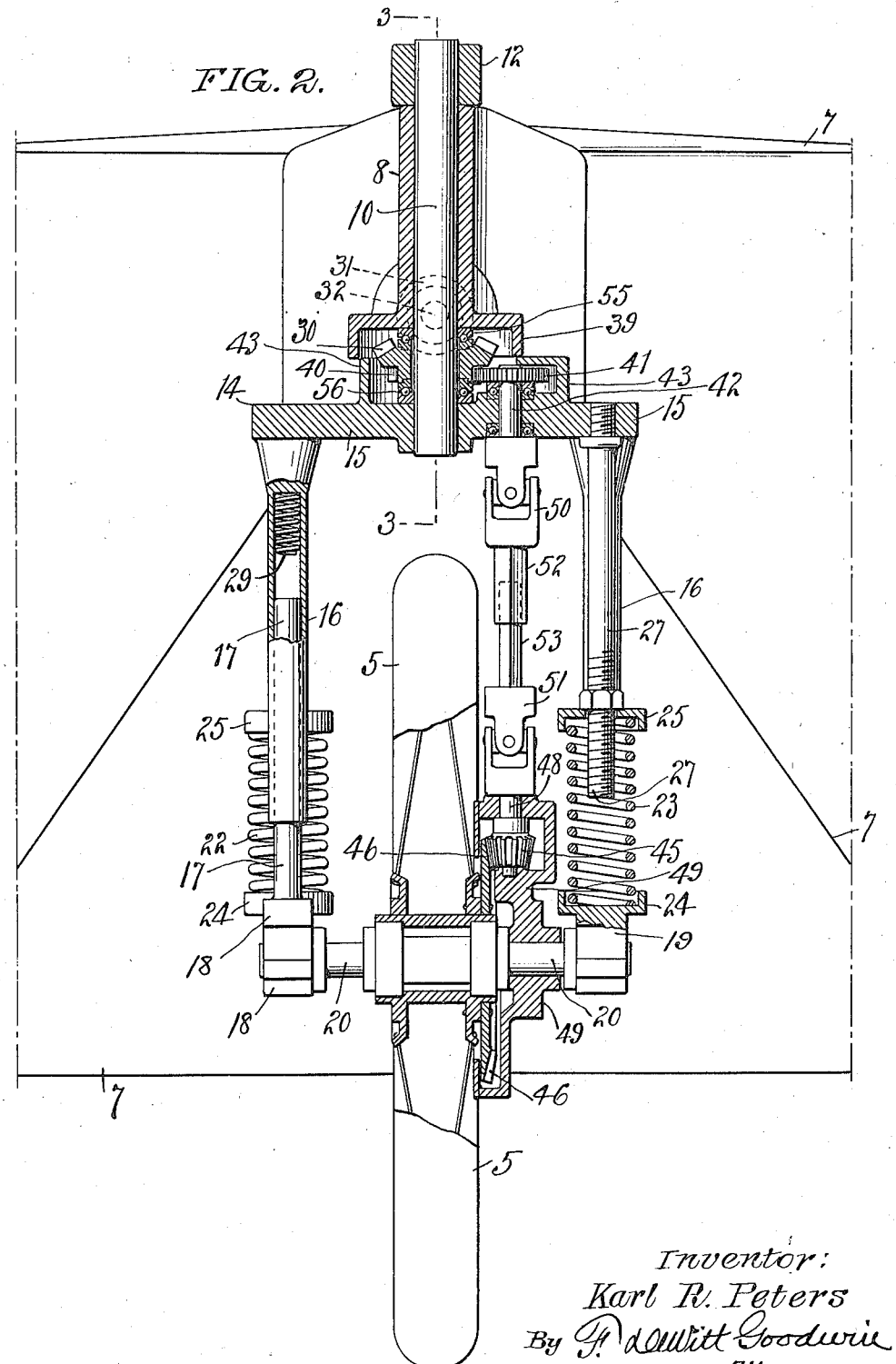
Figure 3:
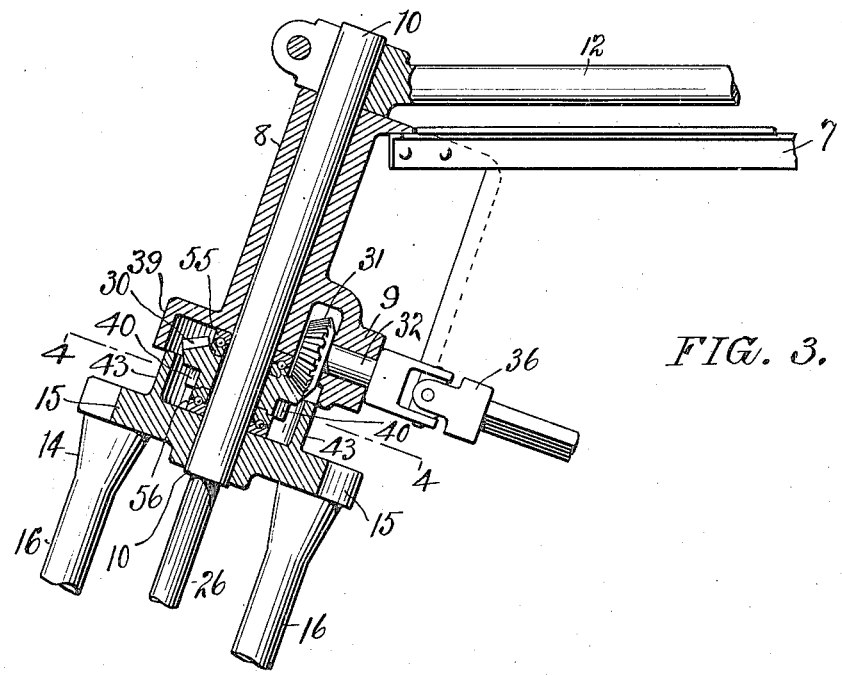
Figure 4:
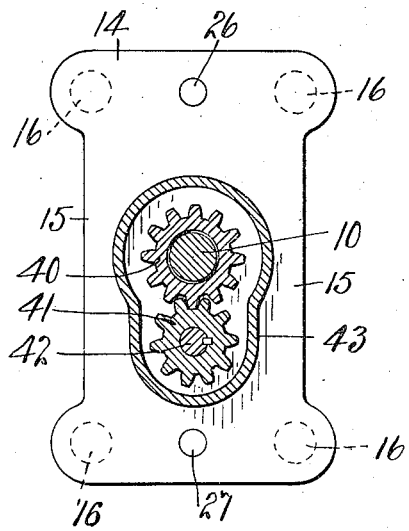

Referring to the accompanying drawings:—Fig. 1 is a side elevation of a portion of a three wheel vehicle illustrating my invention; Fig. 2, is a transverse vertical section of the front portion of the vehicle as on line 2—2, Fig. 1, drawn on a larger scale; Fig. 3 is a vertical section of the driving and steering mechanism, as on line 3—3, Fig. 2; and Fig. 4, is a horizontal section on line 4—4, Fig. 3.

In the accompanying drawings in which like reference characters refer to like parts, 5 represents the front steering and driving wheel, and 6 represents one of the two rear wheels of the vehicle. A vehicle frame 7 is supported at its rear end upon the two rear wheels 6. The front central portion of said frame 7 is provided with a steering head 8, supported upon the front wheel 5.

A steering post 10 is rotatably mounted in the steering head 8 and is adapted to be rotated by a handle 12. The lower end of the steering post 10 is rigidly secured upon a steering frame 14, of forked formation, consisting of a cross-plate 15, having sleeves 16 secured thereto. Said sleeves 16 form telescoping members with the rods 17 secured to the bearings 18 and 19, which, in turn, are rigidly secured to the axle 20, on which the steering and driving wheel 5 is rotatably mounted.

The cross-plate 15 is supported upon coiled springs 22 and 23 which rest in cups 24 formed upon the bearings 18 and 19. Above the said springs 22 and 23 are similar cups 25, adjustably secured upon the rods 26 and 27. Said rods having their upper ends secured in the cross-plate 15, thus the springs will flexibly support the front portion of the vehicle, and the telescoping members 16 and 17, will freely slide vertically upon themselves and guide the steering wheel 5 in vertical alignment with the steering post 10. Bumper springs 29 are provided within the sleeves 16 for limiting the upward movement of the rods 17.

A gear wheel 30 is loosely mounted upon the steering post 10, and transmits power from the motor, mounted upon the vehicle frame, for rotating the wheel 5 and thus permitting the steering post 10 to be freely turned for steering the vehicle.

Said gear wheel 30 is driven by a gear wheel 31, secured to a shaft 32 rotatably mounted in a bearing 9 formed or secured upon the steering head 8. Said shaft 32 is positioned at approximately right angles to the steering post 10, on which the gear wheel 30 is loosely mounted. The said gears 30 and 31 are preferably in the form of beveled gears.

The gear wheel 31 is driven by the motor 35, secured in a fixed position upon the vehicle frame 7. Any desired form of motor may be used. The drive shaft 33 of the motor is connected with the shaft 32 through universal joints 36, for the purpose of reducing the vibration between the engine and the steering wheel 5. Said universal joints 36 are not essential as the driving shaft of the engine may be positioned in a direct line with the bearing 9 formed in the steering head 8 which is rigidly secured to the frame 7, on which the motor 35 is secured.

The beveled gear wheel 30 is constructed with a gear wheel 40 positioned immediately below the teeth forming the beveled gear 30. Said gear wheel 40 meshes with a gear wheel 41 secured on a shaft 42 rotatably mounted in the cross-plate 15. Said gear wheels 40 and 41 are protected by an up-standing flange 43 formed upon the cross-plate 15 which encases the said gear wheels. An enlarged casing 39 upon the steering head 8 forms a covering for said gears.

The shaft 42 is connected with a beveled gear wheel 45 which meshes with and drives the beveled gear wheel 46, secured upon the front wheel 5, of the vehicle. The gear wheel 45 is secured upon a shaft 48 mounted in the bearing 49 secured to the shaft 20. Power is transmitted from the gear wheel 41 through universal joints 50 and 51 and telescoping shafts 52 and 53 which provide for the various changes in the position of the steering and driving wheel 5 in relation to the steering frame 14 and form a means for transmitting the power from the gear wheel 41 to the front wheel 5.

The gear wheel 30 is positioned upon the steering post 10 between the cross plate 15 and the lower portion of the steering head 8. Antifriction bearings 55 and 56 are interposed above and below the gear wheel 30 to insure the gear wheel 30 turning freely and at the same time support the weight of the steering head 8.

By my improved construction of driving mechanism for a vehicle, the power may be applied to the steering and driving wheel from an engine secured upon the vehicle frame; and by providing a gear wheel which is loosely mounted upon the steering frame and positioned in alignment with the axis of the steering post of said frame, the steering of the vehicle will not be affected by the transmission of the power through the steering wheel from the motor. As the said gear wheel is concentrically mounted in relation to the steering axis, the distance between the motor and the steering frame will remain constant and always insure a free transmission of the power regardless of the position of the steering frame. By constructing the steering frame of a relatively large cross-plate, and providing telescoping guide members at the four corners thereof and supporting the same upon coiled springs a substantial and at the same time a flexible suspension means is provided.

Having thus described my invention, I claim and desire to secure by Letters Patent:—

1. A motor vehicle comprising a vehicle frame, a steering head mounted upon the frame, a steering post pivoted within the steering head, a transverse plate rigidly secured to the lower end of the steering post, a steering wheel, an axle carrying the steering wheel, bearings arranged upon opposite sides of the steering wheel and holding the axle, each bearing extending upon opposite sides of the axle, a pair of upstanding guide rods rigidly mounted upon the ends of the bearing upon each side of the wheel and arranged upon opposite sides of the axle, a pair of tubes arranged upon each side of the wheel and slidably receiving the guide rods and rigidly mounted upon the transverse plate near its side and near its front and rear portions, said rods and tubes being spaced, a cap rigidly mounted upon each bearing at a point near the center of the bearing and between the rods, a compressible coil spring having its lower end held within the cap, a depending rod rigidly connected with the transverse plate between each pair of depending tubes and extending into the coil spring, and a cap carried by the depending rod and engaging the opposite end of the spring.

2. A motor vehicle comprising a vehicle frame, a steering head mounted upon the frame, a steering post pivoted within the steering head, a transverse plate rigidly secured to the lower end of the steering post, a steering wheel, an axle carrying the wheel, bearings arranged upon opposite sides of the steering wheel and holding the axle, each bearing extending upon opposite sides of the axle, a pair of upstanding guide rods rigidly mounted upon the bearing near its ends, a pair of depending tubes arranged upon each side of the wheel and rigidly secured to the transverse plate near its front and rear parts and slidably receiving the guide rods, a cap rigidly mounted upon each bearing between the guide rods, a compressible coil spring having one end seated in the cap, a depending rod rigidly secured to the transverse plate between the guide tubes and projecting into the upper end of the spring and having its lower end screw-threaded, a cap mounted upon the upper end of the spring and having an opening to receive the depending rod, and a nut engaging the screw threaded end of the rod and serving to longitudinally adjust the cap upon the rod.

In testimony whereof I affix my signature.

KARL R. PETERS.